A. A. ROTH.
FENDER FOR MOTOR VEHICLES.
APPLICATION FILED SEPT. 27, 1919. RENEWED APR. 14, 1922.
1,435,944.
Patented Nov. 21, 1922.
2 SHEETS—SHEET 1.
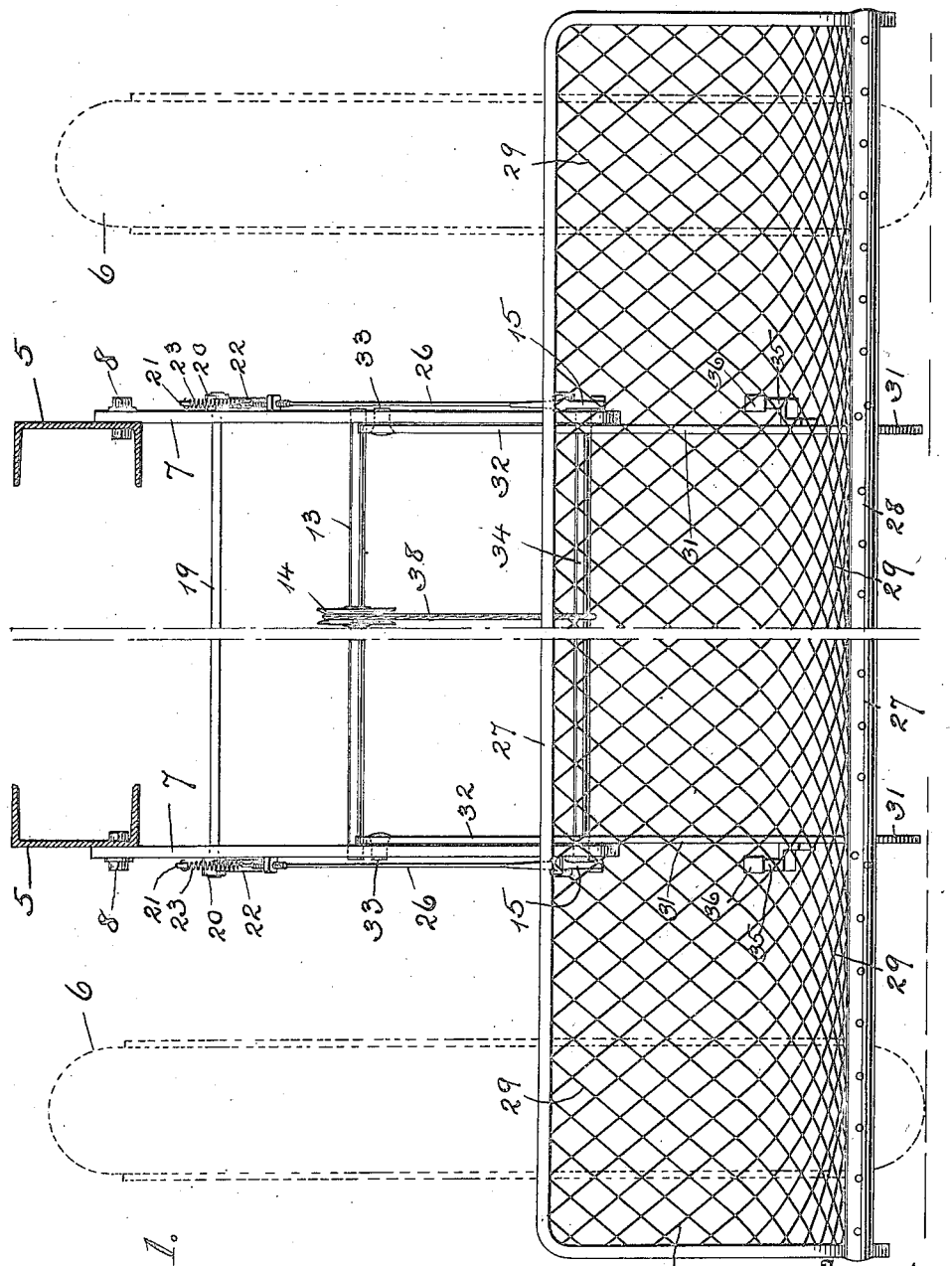

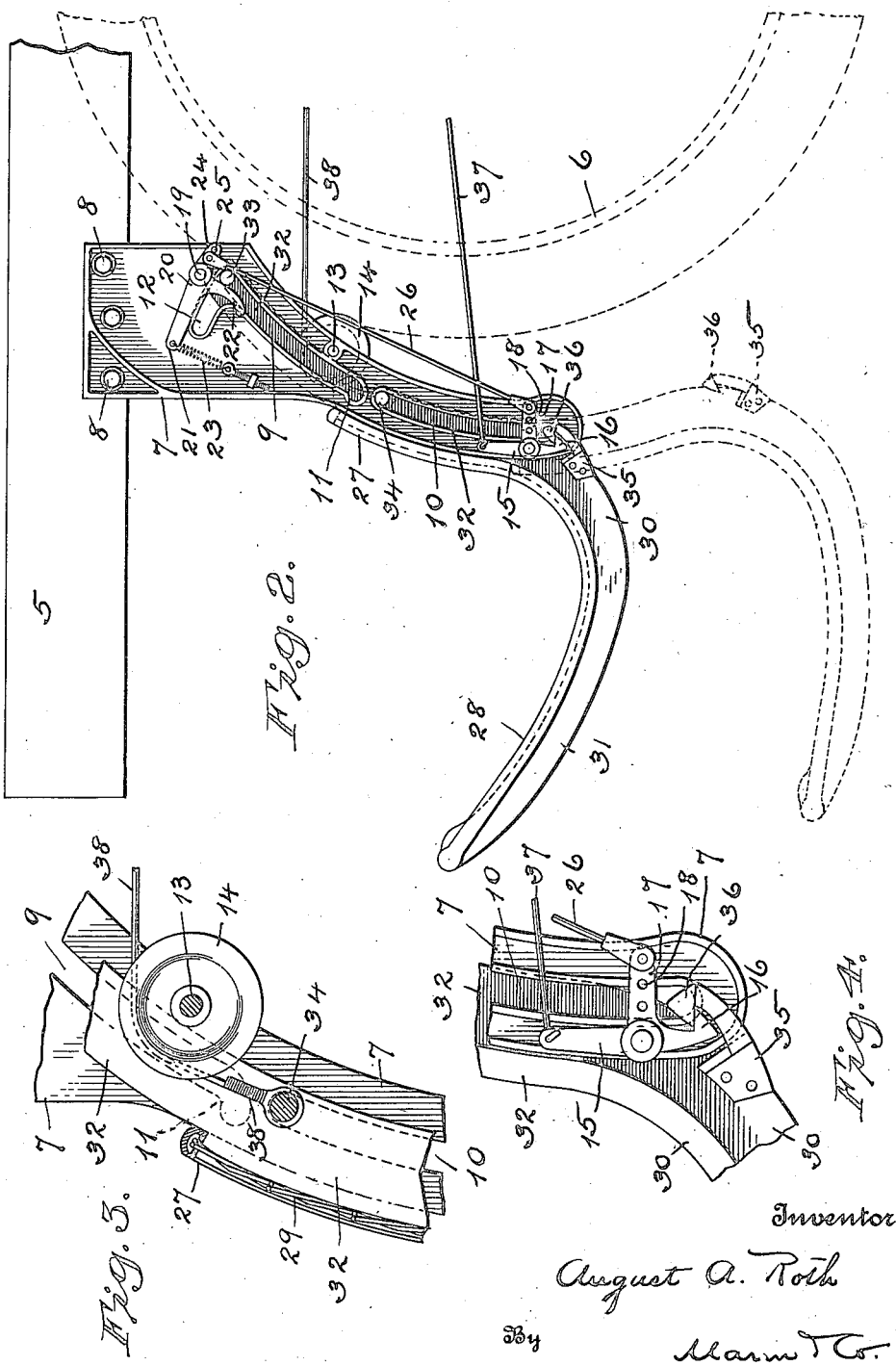

Patented Nov. 21, 1922.

1,435,944

UNITED STATES PATENT OFFICE.

AUGUST A. ROTH, OF BALTIMORE, MARYLAND, ASSIGNOR TO SAFETY FENDER CORPORATION, OF PHILADELPHIA, PENNSYLVANIA, A CORPORATION OF DELAWARE.

FENDER FOR MOTOR VEHICLES.

Application filed September 27, 1919, Serial No. 326,827. Renewed April 14, 1922. Serial No. 552,640.

*To all whom it may concern:*

Be it known that I, AUGUST A. ROTH, a citizen of the United States, residing at Baltimore, in the State of Maryland, have invented certain new and useful Improvements in Fenders for Motor Vehicles, of which the following is a specification.

This invention relates to an improved fender for use on motor vehicles, and has among its objects to provide an exceedingly simple device of this character and one which will practically and effectively perform the work for which it is intended.

Another object of the invention is to provide a fender structure for motor vehicles which will normally be carried in an elevated position with respect to the road-bed but may be moved to the operating position close to the road-bed, either by automatically-operating means, or through the manual operation of devices attached thereto.

A further object of the invention is to provide a fender device for motor vehicles which while normally elevated to clear obstructions in the road, may be actuated by contact with an object to instantly drop to the operating position.

A still further object is to provide novel releasing means for the fender whereby contact at any point on the front of the fender-structure by an object that will produce a rearward pressure, such as contact with a person, will effectively release the fender and cause it to move to the operating position.

Another object is to provide an improved locking means to hold the fender elevated from a plurality of separated points so that vibrations over rough roads or jolts will not accidently release the locking means, and A still further object is to provide a plurality of retaining devices to normally hold the fender in an inoperative position but to so connect said devices that they may be operated simultaneously to promptly release the fender.

With these, and other objects in view, the invention is illustrated in the accompanying drawings, wherein—

Fig. 1. shows the fender structure in front elevation and in the depressed or operating position.

Fig. 2. illustrates the fender in side elevation, but in the elevated position.

Fig. 3. shows an enlarged vertical sectional elevation through the fender and shows the inner side of one of the supporting brackets and the pulley device for elevating the fender structure, and Fig. 4. illustrates the lower latch devices, fender structure and supporting bracket in an enlarged scale and in side elevation.

Referring to the drawings, the numeral 5, designates the horizontal side channel-bars which form part of the automobile chassis and 6, indicates the position of front wheels of the vehicle.

Each channel-bar 5, has secured to it the upper end of a vertically-depending bracket 7. In the present instance these brackets are shown as attached by bolts 8, to the outer side of the channel-bars but in some instances I find it desirable to secure these brackets at the inner sides of the channel-bars.

In the present disclosure each bracket has an upper slot portion 9 and a lower slot portion 10, both of which have a segment or curved shape. By preference the lower end of the upper slot portion 9 and the upper end of the lower slot portion 10, are somewhat separated but in some instances a continuous slot to produce the two portions 9 and 10 may be employed.

The lower end of the upper slot 9, is provided with a slight forwardly-extending enlargement whereby to produce a shoulder 11, for a purpose presently to be explained.

The upper slot portion 9, also has a forwardly-extending offset or branch 12, at its upper end, which will also presently be more fully explained.

A rod 13, extends horizontally between and connects the two brackets 7, and serves to tie said brackets together whereby to make them more rigid and prevent them springing laterally.

In the present instance a grooved pulley 14, is mounted on the horizontal rod 13, and is utilized for a purpose that will presently be explained.

Each vertical bracket 7, is provided near its lower end with a pivoted latch 15, each of which latter has a rearwardly-facing hook 16, and also has a rearwardly-extending arm 17. The arms 17, are preferably provided with a plurality of perforations 18, for adjusting purposes as will presently be explained.

Adjacent to the upper end of the upper slot portion 9, the two brackets sustain a horizontal shaft 19, whose ends have bearing in said brackets and project therethrough, and each end of this shaft carries a rock-lever 20, that has a forwardly-extending arm 21, and a downwardly-extending prong 22. The prong 22, of each rock-lever projects downwardly across the entrance to the branch slot 12, while to the arm 21, there is connected a spring 23, which constantly tends to pull arm 21 down and throw prong 22, rearwardly.

A lug 24, extends rearwardly from each of the rock-levers 20, and this lug is preferably provided with perforations 25, for adjusting purposes as will now be explained.

A connecting rod 26, has its upper end pivotally engaging the lug 24, through one of the perforations 25, and the lower end of the connecting rod is pivotally connected to the rearwardly-extending arm 17 through one of the perforations 18 thereof.

It will thus be seen that the lower latch 15, and the upper rock-lever 20, are connected by the rod 26, and that shaft 19, to which the levers 20, are rigidly attached will be rocked whenever the latch, or lever is moved.

It is to be understood that like arrangement of latches 15, and levers 20, is provided at the side of each vertical bracket 7, so that any movement that is imparted to the latch on one bracket 7, will be instantly transmitted through the rod 26, on that side to the lever 20 at the same side and then by rocking shaft 19, will cause a like movement to the lever, rod and latch on the other bracket.

The mechanism and devices hereinbefore described have to do with those elements that sustain, guide and trip a fender structure which latter will now be explained.

The fender proper is composed of a frame 27, bent into the form of a scoop in that it has a forwardly-extending portion 28, that projects forward in front of the brackets and is of sufficient width to extend in front of both front wheels 6.

The precise construction of the fender is not essential, but it preferably has a network 29, as is common in various forms of vehicle fenders.

Between the opposite ends, the fender has attached thereto two spaced-apart fender-carrying bars 30, which are precisely alike in construction.

These bars have a lower outwardly-curved portion 31, and an upwardly-extending and slightly curved portion 32.

The upwardly-extending portions 32, of the fender bars extend at the inner sides of the rigid brackets 7, and the upper end of each fender bar has a pin 33, extending horizontally therefrom and entering the upper segment-slots 9, in the brackets 7.

Between the upper and lower ends these fender-bars are also connected by a horizontal cross-rod 34, whose ends extend through the fender-bars and enter the lower slot portions 10, in the vertical brackets.

It will thus be seen that the fender bars have upper pins 33, to enter the slot portions 9, of the brackets, and lower rod-ends 34, that enter the lower slot portions 10, of said brackets so that during any vertical movement of the fender-bars at the sides of the brackets, said bars will be guided by the slots and held against lateral movement between the brackets and against forward or rearward movement by the pins and rod-ends in the slots.

Each fender-bar has at its rear near the forwardly-curved portion, a stationary latch-arm 35, which latter is provided with a forwardly-extending hook 36, and the position of these latch-arms are such that when the fender is in the normal or elevated position the hooks 36, will be engaged by the hooks 16, on the pivoted latches 15, and the entire fender structure and its bars 30 will be held by said latches 15, in such elevated position.

When the fender is in the elevated position the rod-ends 34, will be located at the upper ends of the bracket slots 10, while the pins 33, will normally have position at the upper ends of the upper slots 9, and at the rear of the prongs 22, of the rock-levers 20, as shown in Fig. 2 of the drawing. The prongs 22, by yieldingly pressing rearwardly on the pins 33, tend to keep the scoop-end 28—31 of the fender pressed forward,—the rod-ends 34, serving as a pivot between the upper and lower ends of the fender bars. By thus keeping the scoop-end of the fender pressed forward the latch arms 35 and hooks 36 thereof will be held in engagement with the hooks 16 on the latches 15, and all ordinary vibrations or jolts imparted to the fender during the travel of the vehicle over the road will not disengage these hooks.

When the fender contacts with an object however the scoop part 28, thereof will be moved rearwardly and the pins 33, thrown forwardly into the off-set or branch 12,— the rod, ends 34, serving as the rocking point, and this rearward movement of the scoop-part will effect a disengagement of the hook 36, from hook 16 whereupon the fender and its bars will drop downwardly toward the road and assume the position indicated by broken lines in Figs. 2 and by full lines in Fig. 1 of the drawing.

When the scoop part 28 of the fender is moved rearwardly the pins 33 on the upwardly-extending portion 32, of the fender will be swung forwardly into the off-set or branch 12 so as to engage the prongs 22 of the rock-lever 20, and by moving said prongs forward, rock the lever 20 thereby depressing rod 26 and swinging the latch hook 16 from beneath the lug or hook 36 on the fender and allow the latter to drop. The off-set or branch 12 is therefore provided to permit the pins 33 to swing forward so as to release the fender.

In case contact of one extreme side of the fender is made with an object and only one hook 36, is primarily disengaged, the disengagement of that hook is transmitted by the swinging of the released latch 15, at one side; the connecting rod 26 and rock-lever 20 at the same will operate rock-shaft 19, and the movement of the rock-shaft will actuate the rock-lever 20, connecting rod 26, and latch 15, on the other side so that finally the second hook 36, will be released. This operation takes place instantly upon the release of either of the hooks 36 so that the fender will drop immediately when either of both of the hooks is or are operated.

Provision is made for manually releasing the fender by means of a pull rod 37, which is attached to one of the latches 15, as shown in Figs. 2 and 4 of the drawing,—the pull-rod extending rearwardly to a point where it may be actuated conveniently in any suitable way.

A cable 38, is also provided which extends around pulley 14, and has its end attached to the cross-rod 34, whereby the fender may be raised from the car after it has been tripped either automatically or manually.

Having described my invention, I claim,—

1. In a fender for motor vehicles the combination with a supporting means, of latch devices on said supporting means; a fender-frame having a forwardly-extending scoop part,—said frame being engaged by the latch means to normally hold the scoop-part elevated and means for connecting the frame to the supporting means to permit the scoop-part to have a rearward movement when it strikes an object and said latch means being releasable when the scoop-part of the frame is moved rearwardly to allow said scoop-part to drop in substantially a vertical direction.

2. In a fender for motor vehicles the combination with spaced-apart vertical supports, of a fender structure having a bar to slidably engage each support said supports and fender structure having coacting devices to permit a limited rocking movement of the fender structure and latch means for engaging and holding the fender structure elevated when the latter is rocked in one position and to release the same when it is rocked in a reverse position.

3. In a fender for motor vehicles the combination with spaced-apart vertical supports, of a fender structure having a bar to slidably engage each support said supports and fender structure having coacting devices to permit a limited rocking movement of the fender structure; latch means on each support for holding the fender structure elevated and means for connecting the several latch means to effect an operation of one through the other.

4. In a fender for motor vehicles the combination with supporting means, of a fender-frame movable in a substantially vertical direction with respect to the supporting means; a plurality of latch devices to hold the fender-frame in an inoperative position and means for connecting the several latch devices to operate one by the movement of the other.

5. In a fender for motor vehicles the combination with spaced-apart vertical supports having guide means thereon, of a fender-frame having means to engage the guide means on the supports said guide and engaging means permitting a limited rocking motion to the fender-frame and latch means engaging the fender-frame when the latter is in one of two movable positions and disengaging the fender-frame when the latter is moved to the other of said two positions.

6. In a fender for motor vehicles the combination with two spaced-apart pendant supports each having guide slots therein, of a fender-frame having means at each side to engage said guide slots; a latch carried on each pendant support to engage and hold the fender-frame and means for connecting the latches whereby to cause them to operate together.

7. In a fender for motor vehicles the combination with two spaced-apart pendant supports each having guide slots therein, of a fender-frame having means to engage and move in said guide slots; a latch carried on each pendant support to engage the fender-frame; a rock-shaft extending horizontally between said supports, and means connecting each latch with the horizontal rock-shaft whereby the movement of one latch will be transmitted to the other latch through the rock-shaft.

In testimony whereof I affix my signature.

AUGUST A. ROTH.